Dec. 28, 1926.  
A. W. NORDGREN  
1,612,528  
BUMPER FASTENING  
Filed Sept. 30, 1926
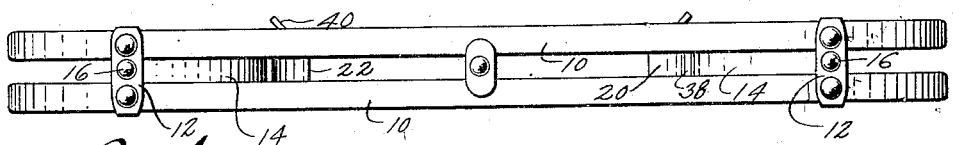
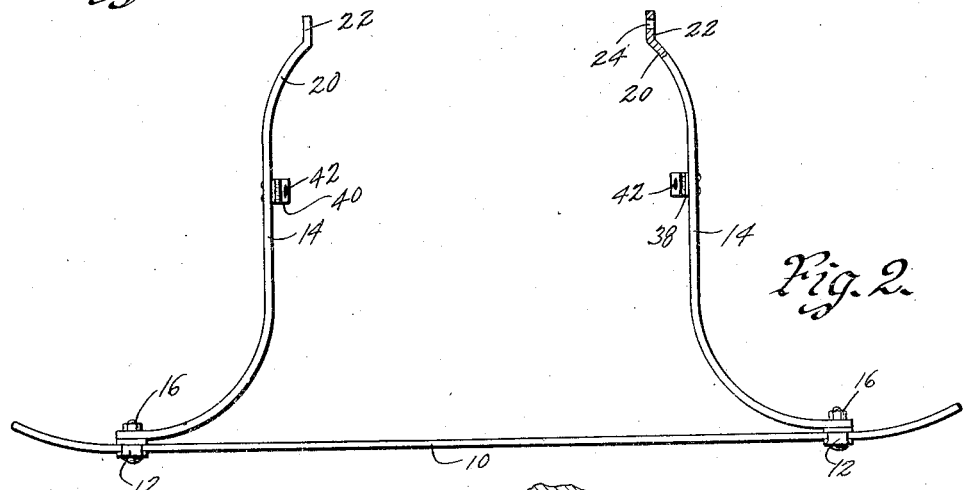
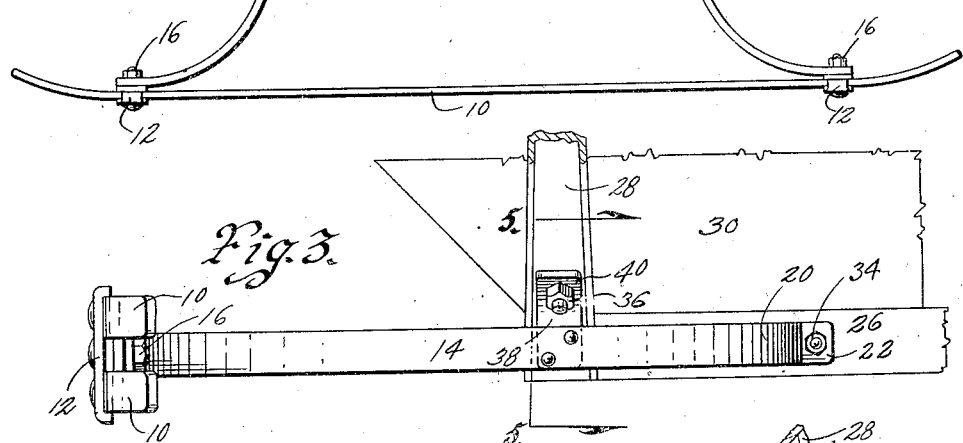
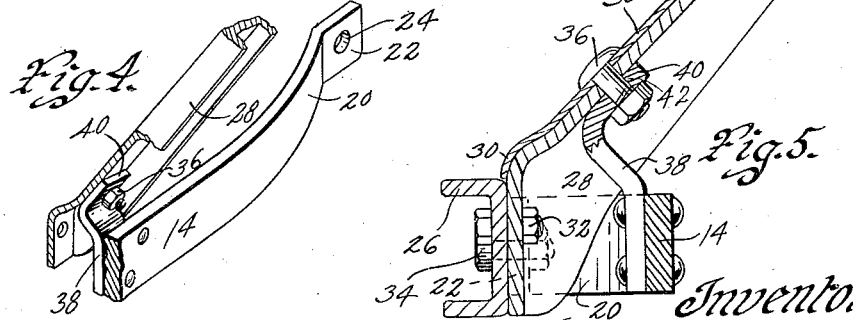

Patented Dec. 28, 1926.

1,612,528

UNITED STATES PATENT OFFICE.

ALGOT W. NORDGREN, OF ST. PAUL, MINNESOTA, ASSIGNOR TO MARQUETTE MANUFACTURING COMPANY, OF ST. PAUL, MINNESOTA.

BUMPER FASTENING.

Application filed September 30, 1926. Serial No. 138,638.

My invention relates to means for supporting bumpers upon automobiles and has for its general object the use of certain fastenings and fittings already found upon certain makes of automobiles whereby the bumper may be quickly and easily fastened and supported upon the automobile.

Still a further object is to provide a bumper fastening adapted to coact with a channel-shaped fender bracket mounted upon the frame of the automobile and adapted to support the fender and have the fender apron rest thereagainst.

Still a further object is to form an offset in the bumper arm or support whereby it will clear the fender bracket and fender apron already upon the automobile.

With these and other objects in view, my invention consists in the construction, arrangement, and combination of the various parts of my fender guard and support, whereby the objects contemplated are attained, as hereinafter more fully set forth, pointed out in my claims, and illustrated in the accompanying drawings, in which:

Figure 1, is a front view of my bumper.

Figure 2, is a top plan view showing the offset portion in the bumper arms.

Figure 3, is a side view of the bumper and support connected to an automobile frame and fender bracket.

Figure 4, is a perspective view of the fender bracket and bumper support with the fastening therebetween, and Figure 5, is a detail sectional view taken on line 5—5 of Figure 3.

In the accompanying drawings I have used the reference numeral 10 to indicate a pair of spaced bumper elements which are connected together by proper fittings 12 for holding the bumper elements 10 in spaced apart position.

Connected to the fittings 12 and extending rearwardly therefrom or towards the automobile, are the bumper arms or supports 14. Each support 14 is bowed inwardly or towards the other bumper arm or support from the fittings 12.

A bolt 16 extends through each of the fittings 12 and through the outer or forward ends of the bumper arms or supports 14 as clearly illustrated in Figure 2 of the drawings.

The bumper arms are offset near their rear or inner ends as at 20. The extreme rear ends of the arms 14 are each formed with a flat portion 22 having a bolt opening 24 therein. The flat portion 22 rests against the side frame 26 of an automobile.

The side frame or chassis 26 of the automobile has fixed thereto a channel-shaped fender bracket 28 extending upwardly and outwardly from the frame 26.

Resting upon the fender bracket 28 is the fender apron 30. The bracket 28 is connected to the frame 26 by a bolt 32. A bolt 34 extends through the opening 24 in the arm 14 through an opening in the frame 26 for connecting the rear or inner end of the arm to the automobile frame.

The offset portion 20 is provided so as to cause each of the bumper arms 14 to clear the fender bracket 28 as clearly illustrated in Figure 5 of the drawings.

The fender apron 30 is connected to the fender bracket 28 by a bolt 36 and it is this bolt that each of my bumper arms or supports 14 is connected to intermediately of its ends in the manner which I will now describe.

An upstanding lug or projection 38 is riveted or otherwise fastened to each of the bumper arms 14. Each of the projections 38 is directed inwardly a slight amount or towards the fender bracket 28 and is then inclined upwardly and outwardly so as to provide a bracket engaging portion 40.

The bracket engaging portion 40 conforms to the incline of the bracket itself and is provided with an opening 42 through which the bolt 36 is designed to extend.

The bolt 36 may be the original bolt which is provided for securing the fender bracket 28 to the fender apron 30 or a slightly longer bolt may be used in order to serve the purpose of connecting the projection 38 to the fender bracket 28.

The projections 38 are received between the two side flanges of the channel-shaped fender brackets 28 as clearly illustrated in Figure 4 of the drawings. By providing the upstanding projection 38 and using the bolt 36 for connecting the same to the bracket 28, I am able to have the bumper arms or supports 14 substantially parallel with the side frame member 26 and at the same time be able to get at the bolt 36 for easy installation of the bumper arms.

It will be noted that the upstanding projection 38 provides a fastening for the bumper arm intermediate of its ends while the bolt 34 provides a direct fastening between the rear end of the bumper arm and the side frame member 26.

One of the advantages of my construction resides in the use of such a bumper support as will coact with the standard parts of such automobiles as the Ford.

Some changes may be made in the construction and arrangement of the parts of my device without departing from the real spirit and purpose of my invention, and it is my intention to cover by my claims, any modified forms of structure or use of mechanical equivalents, which may be reasonably included within their scope.

I claim as my invention:

1. The combination with the side frame member of an automobile, of a channel-shaped fender bracket secured to said frame member and extending upwardly and outwardly therefrom, a bumper supporting arm secured to said frame member at its rear or inner end, a projection carried by said arm intermediate of its ends and received in said fender bracket between the side flanges thereof and a bolt extending through the said projection and bracket for connecting said projection to the bracket.

2. The combination with the side frame member of an automobile, of a channel-shaped fender bracket extending upwardly and outwardly therefrom, a bolt for securing said fender bracket to the side frame member, a bumper supporting arm secured to said frame member at its rear or inner end, a projection carried by said arm intermediate of its ends and received in said fender bracket between the side flanges thereof and a second bolt extending through the said projection and bracket above said first bolt for connecting said projection to the bracket.

3. The combination with the side frame member of an automobile, of a channel-shaped fender bracket secured to said frame member and extending upwardly and outwardly therefrom, a bumper supporting arm secured to said frame member at its rear or inner end, a projection carried by said arm intermediate of its ends and received in said fender bracket between the side flanges thereof, said arm having an offset therein intermediate of its ends for clearing the fender bracket.

4. In combination with the side frame member of an automobile, a channel-shaped fender bracket secured to said frame member and extending upwardly and outwardly therefrom of a bumper arm secured to said frame at its rear or inner end, a projection carried by said arm intermediate of its ends, said projection having a portion bent upwardly and outwardly and adapted to fit into the fender bracket against the web and between the side flanges thereof and a bolt extending through said portion and bracket for connecting said projection to the bracket.

5. In combination with the side frame member of an automobile, a channel-shaped fender bracket secured to said frame member and extending upwardly and outwardly therefrom of a bumper arm secured to said frame at its rear or inner end, a projection carried by said arm intermediate of its ends, said arm having an offset therein between its inner end and said projection having a portion bent upwardly and outwardly and adapted to fit into the fender bracket against the web and between the side flanges thereof and a bolt extending through said portion and bracket for connecting said projection to the bracket.

ALGOT W. NORDGREN.